Jan. 13, 1931.   T. H. JONES   1,789,002
CIRCULAR KNITTING MACHINE
Filed March 19, 1927   9 Sheets-Sheet 1

Inventor
Thomas Henry Jones
By John S. Barker
Attorney

Jan. 13, 1931. T. H. JONES 1,789,002
CIRCULAR KNITTING MACHINE
Filed March 19, 1927 9 Sheets-Sheet 2

Jan. 13, 1931.   T. H. JONES   1,789,002
CIRCULAR KNITTING MACHINE
Filed March 19, 1927   9 Sheets-Sheet 4

Inventor:
Thomas Henry Jones
By John S. Barker
atty.

Jan. 13, 1931. T. H. JONES 1,789,002
CIRCULAR KNITTING MACHINE
Filed March 19, 1927 9 Sheets-Sheet 5

Inventor:
Thomas Henry Jones
By John S. Barker
Atty.

Jan. 13, 1931.  T. H. JONES  1,789,002
CIRCULAR KNITTING MACHINE
Filed March 19, 1927  9 Sheets-Sheet 7

Inventor:
Thomas Henry Jones
By John S. Barker
atty.

Jan. 13, 1931. T. H. JONES 1,789,002
CIRCULAR KNITTING MACHINE
Filed March 19, 1927    9 Sheets-Sheet 9

Fig. 26.

Inventor:
Thomas Henry Jones
By John S. Barker
Atty.

Patented Jan. 13, 1931

1,789,002

UNITED STATES PATENT OFFICE

THOMAS HENRY JONES, OF WOODTHORPE, ENGLAND

CIRCULAR-KNITTING MACHINE

Application filed March 19, 1927, Serial No. 176,744, and in Great Britain March 20, 1926.

This invention comprises improvements in or relating to circular knitting machines and has particular, although not exclusive, reference to machines employed in the manufacture of hose and half-hose, an important object being the production in said hose and half-hose of patterns or patterned effects by the employment of change-over or reverse plating, that is to say, by the operation of relatively displaceable yarn guides or controlling elements which by their disposition determine which of a plurality of threads fed to the needles will appear on the front or face of the fabric.

The principal feature of the present invention consists in the provision in circular knitting machines, of a plurality of patterning devices, means for traversing said patterning devices in a plurality of different paths, thread controlling means and selector means functioning to select any one or more of said patterning devices to operate said thread controlling means.

Another feature consists in the provision in machines as above of a plurality of rotatable members carrying patterning elements, and selector means operable to select any one or more of said rotatable members to operate upon the same or selected thread controlling means.

A further feature consists in mounting the rotatable patterning members coaxially and providing means whereby each of said members is independently rotatable.

A further feature consists in the incorporation of means for transmitting rotary motion to the patterning members at different speeds.

A still further feature consists in transmitting the requisite movement to the thread controlling means from the patterning members through the intermediary of spring influenced slidable means with which the selector means coact.

A still further feature consists in causing the selected patterning members to operate upon a plurality of relatively displaceable thread guiding or feeding members adapted by their relative disposition to produce change-over or reverse plating.

Another feature resides in the production on circular knitting machines of hose and/or half hose having a patterned leg and foot upper and a plain sole all of uniform thickness throughout excepting where reinforcing or splicing threads may be introduced.

Numerous other features of the invention are included in the particular construction, arrangement and mode of operation of a knitting machine as is hereinafter more fully described.

For the purpose of more fully describing the nature of this invention reference will now be made to the accompanying drawings, wherein:—

Figure 1:
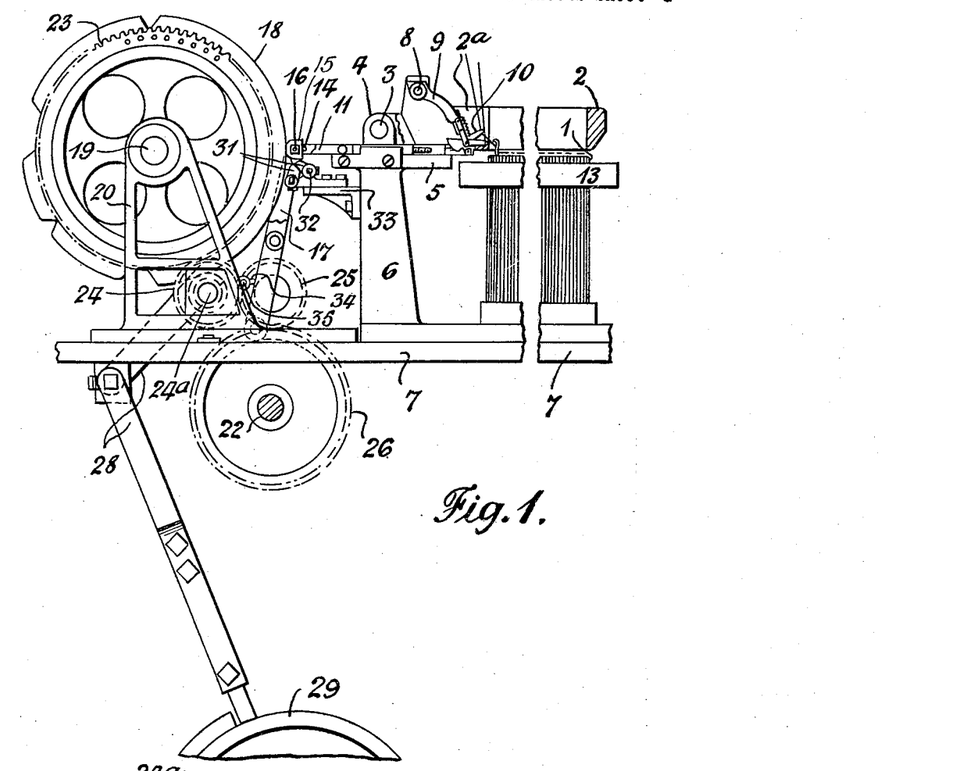
Figure 1 is a part-sectional side elevational view illustrating part of a circular knitting machine constructed in accordance with one embodiment of this invention.

In one method of carrying out the invention a machine is provided having a rotating needle cylinder 1 with latch ring 2 hinged at 3 between lugs 4 projecting up from a table 5 carried by a pillar 6 from the machine bed 7.

Pivotally mounted upon a pin 8 which extends between upward projections of laterally projecting hinge arm portions 2a of the latch ring 2 is a small thread guide carrier arm 9 which normally depends downwardly towards the needle cylinder, said arm being recessed on each side at its lower part and each recess accommodating a small centrally pivoted thread guide 10 which guides are capable of relative movement in parallel vertical planes. Small retaining strip members 9a may be fixed to the guide carrier arm 9 on each side of the two centrally pivoted thread guides 10.

Mounted within guides on the aforesaid table 5 in a horizontally slidable manner is a frame member 11 which may be of approximately stirrup formation, the side bars of said frame extending one at each side of the latch ring hinge, and being capable of a movement between limits in a direction radial to the machine cylinder 1.

Figure 3:
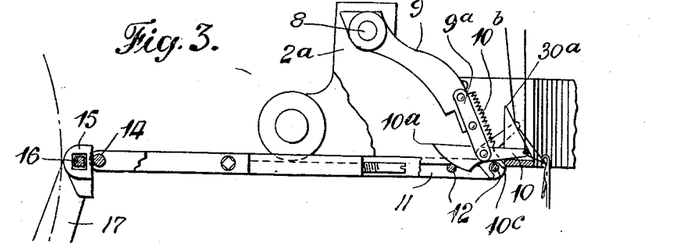
Figure 3 is an enlarged part-sectional side elevational view of part of Figure 1.

This sliding frame 11 has two parallelly spaced transverse pins 12 at that end nearest to the needle cylinder, one of said pins being adapted to coact with one pivoted thread guide 10 and the other with the second guide in such a manner that by a sliding movement of the frame 11 in either direction the two guides 10 are pivotally displaced relatively to each other, see Fig. 3. These two guides are provided with thread guide apertures at that end adjacent to the needles, the two apertures being positioned one higher than the other, and as the relative positions of the two apertures determines the relative positions of the two threads when laid upon the needles and consequently also which thread plates, it will be understood that the reversal of the positions of the guides and apertures will reverse the plating.

The sliding frame 11 operates at a position between the throat plate of the latch guard 2 and the sinker ring 13, a suitable recess or opening being provided below the level of the guard for this purpose.

At the end of the sliding frame 11 remote from the thread guides 10 is a cross pin 14 against which bear a plurality of elements or bluffers 15 slidably mounted upon a transverse rod 16 of square section mounted at the upper ends of a pair of parallel arms 17 extending up from and pivotally connected to suitable parts upon the machine bed 7.

The aforesaid bluffing elements 15 are disposed between the rear or outermost part of the sliding frame 11 and the peripheral faces of a plurality of pattern or cam wheels or discs 18 rotatably mounted upon a common axle 19 carried by upstanding brackets 20 fixed to the machine bed, the faces of the bluffing elements 15 engaging with the pattern discs being rounded while the opposite faces engaging with the sliding frame are flat. The sliding frame 11 is normally pressed up against the sliding bluffers 15 by springs 21.

The pattern discs 18 are disposed side by side, each being driven from a convenient drive shaft 22 through a train of gears. Preferably each disc has a peripheral gear wheel 23 which meshes with a comparatively small gear 24 upon a cross shaft 24a beneath the discs 18, said shaft with gears being rotated from intermeshing gears 25, 26 at the one end. On this cross shaft 24a is a spring-pressed dog clutch 27 which is operated through suitable pivoted lever mechanism 28 from a revolving cam 29, pattern chain or the equivalent at the required time axially to displace the shaft and gears 24 carried thereby so as to arrest the rotary motion of the pattern cam discs 18. Normally all gears are in mesh for effecting patterning.

The several pattern discs 18 are provided with detachable and interchangeable peripheral cam pieces, pegs or the like, and as the discs rotate said cams transmit a forward motion to the horizontally sliding frame 11 through the aforesaid interposed bluffers 15 and in so doing pivotally displace the thread guides 10.

In one arrangement the one pivoted thread guide has at its end remote from the thread aperture a cam face 10a Fig. 3 adapted when pressed upon by one of the transverse spindles 12 at the forward end of the sliding frame 11 to depress the forward end of the guide against the resistance of a spring 10b.

The second guide is of cranked formation and has an inclined or cam slot 10c with which the other transverse spindle 12 of the frame engages so as to raise the guide on the forward stroke and lower same on the backward stroke.

Figure 6:
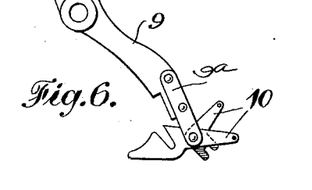
Figures 6, 7, 8 and 9 are detail views each showing a modified arrangement of thread guides and means for relatively displacing same.

In a modification, both guides have inclined slots for accommodating the cross spindles 12 of the sliding frame, as shown in Figure 6.

Figure 7:
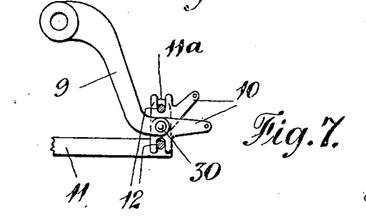

In another arrangement (Figure 7) both guides 10 are cranked and slotted and both are pivoted between their ends upon a common pivot 30 at the end of the carrier arm 9. The two transverse pins 12 are, in this arrangement, positioned one above the other and connected for movement in unison by upstanding pieces 11a at the forward end of frame 11. The frame is in Figure 7 shown in its rearmost position and it will be seen that when said frame is slid forwards, the pins 12 will operate in the slots to pivot the guides and reverse their relative positions.

Figure 4:
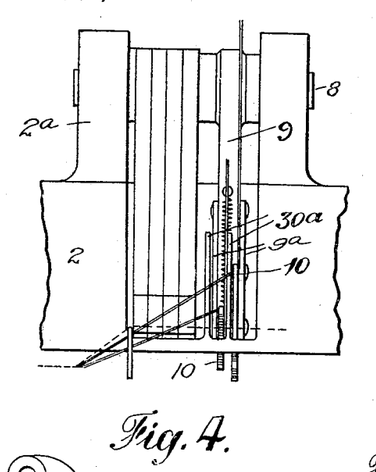
Figure 4 is an end view, still further enlarged, of Figure 3.

To ensure that the threads are always fed to the needles at an accurate plating angle irrespective of the relative positions of the guides 10 a pair of vertically disposed triangular plates 30a (Figures 3 and 4) are provided, one located between the guides and the second on that side of the guides from which the threads extend, said threads passing over the diagonal edges of the plates to the needles.

Figure 2:
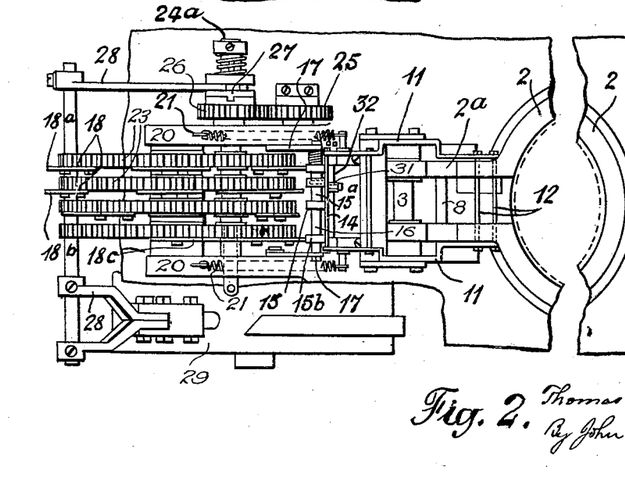
Figure 2 is a plan view of Figure 1.

If desired four pattern discs 18 are provided, one 18a (Figure 2) being adapted for producing vertical and/or diagonal stripes in the fabric, two others 18b adapted for simultaneous rotation to produce diamond patterns, and a fourth 18c furnished with a projecting cam extending around one half of the circumference for holding the sliding frame forward for one half of each revolution so as to permit of patterning being produced on one half of the revolution only, for example when producing a patterned foot upper with plain sole.

These pattern discs are brought into operation as and when desired by the selective displacement of the sliding elements or bluffers 15 interposed between same and the sliding frame 11. Advantageously, three of said elements 15 are incorporated upon one sliding sleeve 15a (Figure 2) for simultaneous axial displacement, and are so spaced that when said sleeve is in one position only the first-named disc 18a operates the guides, while when in the other position, said disc 18a is inoperative and the two second-named discs 18b are in operation. The fourth bluffing element 15b is independently movable into and out of engagement with the fourth disc 18c, i. e. the half-cam disc.

Figure 5:
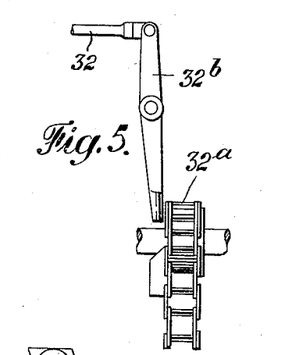
Figure 5 is a detail view of part of the mechanism shown in Figures 1 and 2.

The desired movement of the bluffing elements 15 may be effected by the manipulation manually or automatically of adjustable fingers 31 mounted upon cross spindles 32 carried by a bracket 33 located beneath the rear or outer part of the sliding frame 11, one of said fingers 31 being adapted to coact with a downwardly depending lug on the sleeve 15a bearing the aforesaid three cam-engaging bluffers 15 and the second finger coacting with a similar lug on the independently bluffing element 15b. Preferably all the elements 15 are displaceable against spring resistance. The requisite displacement of the bluffing elements may be effected from cam bits on a traversing chain 32a and centrally pivoted lever 32b as shown in Figure 5.

When it is desired to continue plating with the same thread for a period of one or more revolutions of the machine an interceptor 34 is brought into operation at the required time to press the sliding frame 11 forward and hold same there for the desired period. In this way horizontal stripes can be produced. This interceptor 34 may be in the nature of a lateral projection on a rotatable spindle 35 which spindle at the required moment is turned to press the interceptor on to the pivoted arms 17 carrying the slidable elements 15 coacting with the cams 18, so as to press said arms 17 and elements 15 forward. The interceptor spindle 35 may be borne by the brackets 20. (See Fig. 1.)

It will be understood that while the leg of a stocking or sock is being knitted, the half-cam pattern disc 18c is inoperative, and the other discs 18a, 18b are selected for operation as desired. When the foot is being produced, the half-cam disc 18c is brought into operation so as to produce a plain sole with patterned upper. At the heel and toe, the clutch 27 is operated to stop the rotation of the pattern discs and the interceptor 34 is brought into operation to maintain a plain plated feed.

It will be obvious that as all plain portions of the fabric are produced by pushing the sliding frame 11 forward, the same coloured thread is caused to plate throughout all said plain parts.

If desired the throwing out of operation of the patterning mechanism during the production of a plain sole and restricting the patterning to the foot upper during the knitting of the foot may be accomplished from the cam drum 29 which constitutes the main control drum and revolves at the rate of one complete revolution in the production of the stocking or sock. On this drum 29 is an edge or side cam rise 35 (Figure 10) with which is adapted to engage the lower end of a rod 36 pivoted to a fixed pivot 37 between its ends, a spring 38 holding the rod in contact with the drum. The upper end of rod 36 is formed to bear on the outer face of a square or other shaped bluffer 39 slidably assembled upon a square spindle 16a carried by the pivoted arms 17; and when the cam 35 coacts with the lower end of rod 36, the upper end of the rod presses the bluffer 39 along spindle 16a against the resistance of a spring-pressed pin 40 or other element and brings said bluffer into engagement with the half cam disc 18c. The cam on this disc then pivots the arms 17 and through a roller 41 on said arms presses upon the rear end of the sliding frame 11 to move same forward and retains the guides 10 stationary during each half revolution, i. e. while the sole of the foot is being knitted, the frame 11 moving back after the passage of the half cam on disc 18c, and being there maintained during the other half revolution—that is while the upper of the foot is being knitted.

Figure 10:
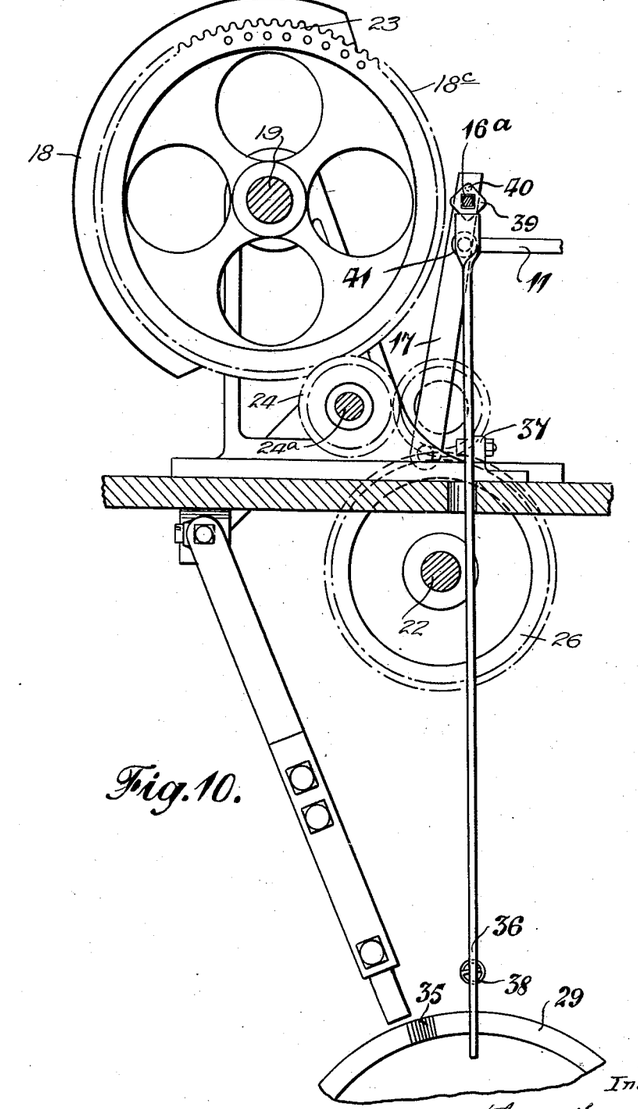
Figure 10 illustrates in side elevation means operable from the main control drum of the machine for controlling the movement of the thread guides during the production of the foot.

After the cam rise 35 has passed the rod 36, the bluffer is allowed to move out of the path of the half-cam disc 18c.

Means are advantageously incorporated whereby any one or more of the pattern discs 18 may be rotated relatively to and independently of the other discs for enabling the commencement of a pattern to be determined. This may be accomplished by providing means for sliding any one or more of the smaller gears 24 out of mesh with the gears 23 on the discs 18.

In another modification (Figures 11 and 12), a pattern wheel 42 in addition to the pattern wheels designated 18 and which have been already described, is provided on the shaft 19, said wheel being intermittently rotated independently of the discs 18 from an additional shaft 43 by means of an eccentric 44 which operates through eccentric rod 45 to transmit a rocking motion to a centrally pivoted two armed lever 46 working on an extension of shaft 19 and in so doing cause a spring-influenced pawl 47 engaging with peripheral teeth on said wheel 42 to rotate said wheel. An opposite rotation of the wheel 42 is prevented by a spring-influenced check pawl 48.

This additional wheel 42 constitutes a pattern control wheel and functions automatically to determine the relative positions of the sliding elements or bluffers 15 and consequently also which of the wheels 18 are in operation at any given time. To accomplish this the control wheel 42 has adjustably and detachably screwed or otherwise fixed on its one side face, near the periphery, suitably sized and shaped cam bits 49 which are adapted to coact with a nose portion 50 fixed at the end of a spindle 51 (Figures 11 and 13) which is slidable within a pair of upstanding arms 52 pivoted at their lower ends to the machine bed 7, said arms 52 being the equivalent of the before-described arms 17. The sliding spindle 51 has fixed thereon a forked member 53 which engages with one of the sliding bluffers 15, the four bluffers appertaining to the four pattern discs 18 being, in this case carried by a single sleeve so as to be moved in unison. The arrangement is such that when a side cam bit 49 coacts with the nose 50, the spindle 51 is slid axially and by the fork 53 displaces the bluffers 15 against spring 15c, thus selecting the discs for vertical or diagonal patterns. It is to be understood that in both this and in the previously described arrangement, a neutral position is obtained by locating the bluffers in between the several discs.

Figures 11, 19:
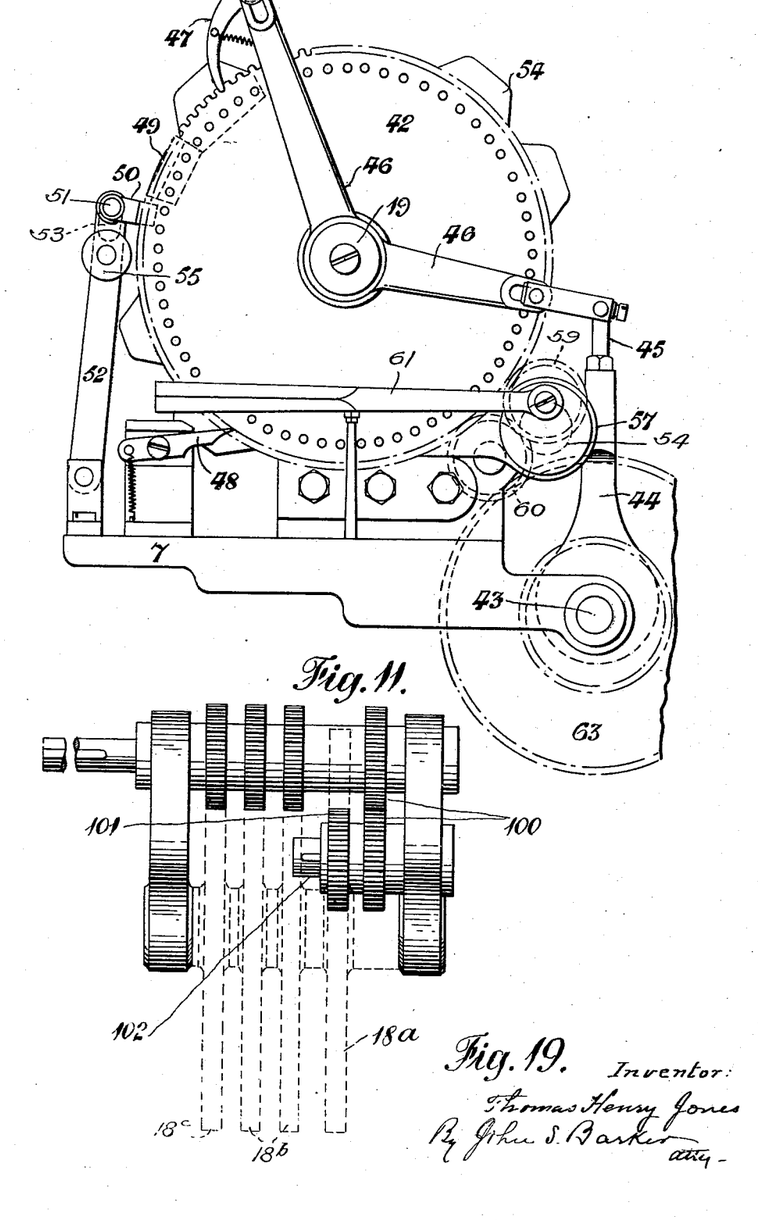
Figure 11 illustrates in side elevation additional pattern controlling means, the figure being drawn looking at the opposite side of the machine to that shown in Figure 1.
Figure 19 illustrates a method of effecting relative rotation of certain of the pattern discs in a reverse direction.

When it is required to produce horizontal stripes in the fabric, the bluffers 15 are moved by the said side cam bits 49 into neutral position and suitable circumferential cam bits 54 on the control wheel 42 are caused to engage with a roller or truck 55 at the end of the bluffer-carrying spindle, and in so doing press forward the arms 52 on their pivots, which movement slides forward the frame 11 and holds stationary the thread guides for a desired period.

To enable the start of a pattern to be variably determined, the gear wheel 23 associated with one (or more) of the pattern discs 18 is disengaged from its small intermeshing driving gear, thus enabling the disengaged disc to be turned to the required position. This may be accomplished by rotatably mounting upon a fixed bracket 56 (Figures 11 and 12) a disk 57 carrying an eccentric shaft 58 on which are freely mounted a pair of small gears 59, 59a one of which 59 meshes continually with a small gear 60 while the other gear 59a is adapted to be moved into and out of engagement with the gear 23 associated with one of the discs 18. The gear 60 constitutes one of a series of similar gears mounted upon a cross shaft and corresponding to the gears 24 and shaft 24a previously described.

Figures 12, 14, 15, 16:
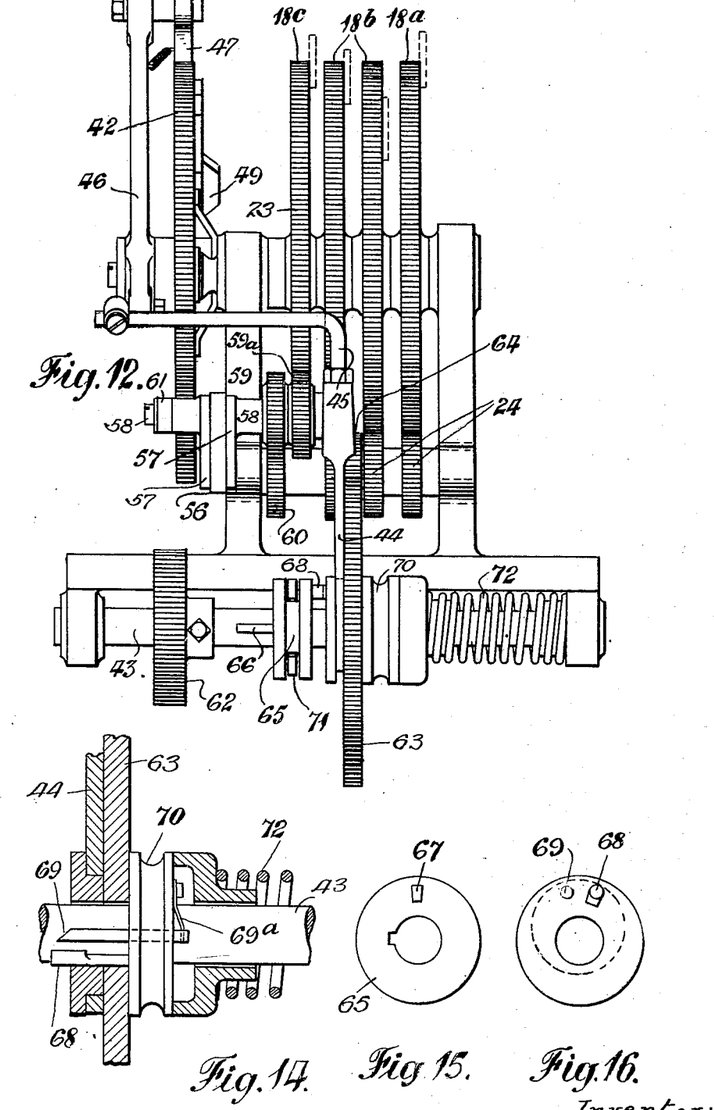
Figure 12 is an end elevation of Figure 11.
Figure 14 is a sectional view of the clutch shown in Figure 12.
Figures 15 and 16 are detail views of the opposing faces of the two clutch members.

A suitable handle 61 is connected to the disk 57, and by manipulation of this handle the eccentric shaft can be rotated so as to roll the gear 59 around the gear 60 and in so doing displace the gear 59a from the gear 23 of the pattern disc.

The drive for the pattern discs is transmitted from the main drive shaft to a gear 62 on the extra shaft 43 and through a clutch (hereinafter described) on said shaft to the gear wheel 63 which meshes with a small gear 64 on the cross shaft carrying the gears 24.

In order automatically to throw the pattern discs out of operation during the knitting of the heel and toe a clutch member 65 is adapted to be slid axially upon a key 66 on the shaft 43, said clutch member 65 having a fixed lug or dog 67 which is adapted to be moved into and out of position between two axially extending pins 68, 69 carried by a second clutch member 70, said fingers slidably projecting laterally through the gear wheel 63. The one pin 69 is independently longitudinally displaceable against the resistance of a spring 69a see Fig. 14.

The clutch member 65 is slid to and fro by the clutch fork 71 simultaneously and automatically with the operation of the customary arm or lever which is displaced in the usual manner for bringing in reciprocatory motion of the machine for producing the heel and toe and for reverting to the rotary motion after knitting said parts. The resilient mounting of the one clutch pin 69 permits of same being displaced for enabling the dog 67 to take up its position between the two pins 68, 69, after having been displaced therefrom. This is also facilitated by bevelling the end of pin 69.

The clutch part 70 is displaceably held in position by a strong spring 72.

Figure 8:
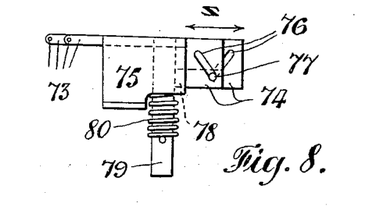

In one such construction (Figure 8) the two thread guides 73 are mounted one on each of two plates or slides 74 which are adapted to slide to and fro within a housing 75 in the directions indicated by double-headed arrow Z. The two slides have oppositely inclined slots 76 within both of which slide a pin 77 carried by a lateral arm 78 of a spindle 79. This spindle bears directly or indirectly upon slidable member 80 which constitutes a substitute for the before-described frame 11 and which is operated upon by the bluffing elements 15, a spring 80 on said spindle 79 maintaining the latter in contact with the part coacting with the bluffers. It will be appreciated that when the spindle 79 is axially displaced by the patterning discs 18 the pin 77 traverses the slots 76 and the guides 73 are moved in opposite directions.

Figure 9:
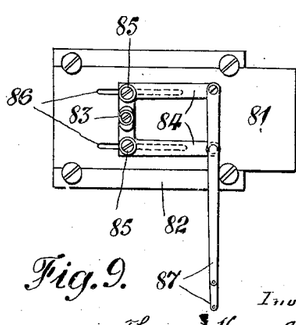

In another arrangement (Figure 9) a slide 81 is traversed to and fro within a guide 82 from the pattern discs, said slide having an upstanding pin 83 which projects through a slot in the one end of each of a pair of crank arms 84 pivoted on stationary pins 85 passing through slots 86 in the slide 81. To the other end of each crank 84 is connected a thread guide 87, and in operation, the movement of slide 81 carries with it the pin 83 and rocks both cranks 84 about their pivots 85, thus relatively moving the guides 87.

In a further modification (Figures 17 and 18) a bar or plate member 88, coacting through suitable roller 89 or other means with a pattern disc, is slidably mounted against spring resistance within a bracket or frame 90, said slide having a projecting part formed with a V-shaped throat which accommodates the one end of each of a pair of arms 91 pivoted between their extremities on a common pivot 92; a spring 93 holding said arms within the V. These pivoted arms 91 are shaped at their free ends to have a sliding contact with projections 94a on a pair of centrally pivoted thread guides 94, which guides are held in contact with the arms 91 by springs 95. The guides 94 are pivoted at 96 to a suitable bracket 97, which in turn is pivoted at 98 so as to permit of the two guides being simultaneously raised out of operation.

Figures 13, 18:
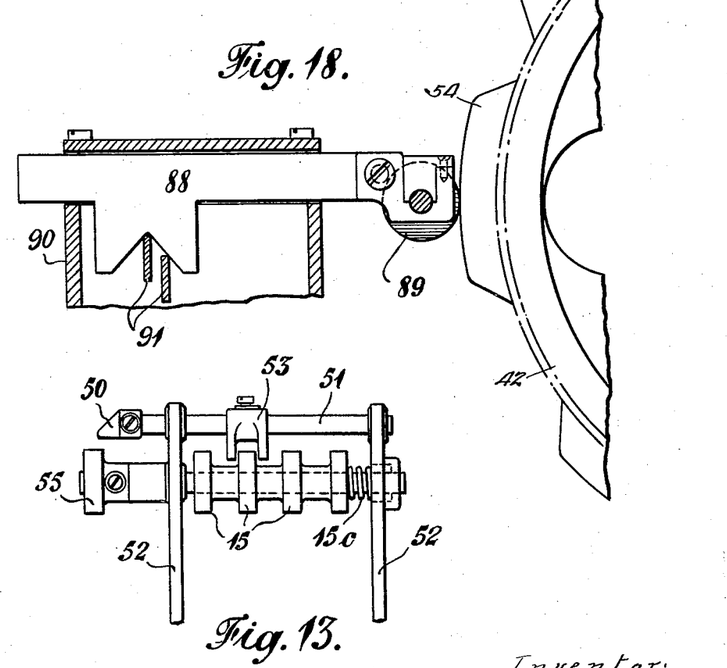
Figure 13 is an end elevational view of part of the mechanism shown at the extreme left of Figure 11.
Figure 18 is a view taken at right angles to Figure 17 and forming a continuation thereof.
Figure 17:
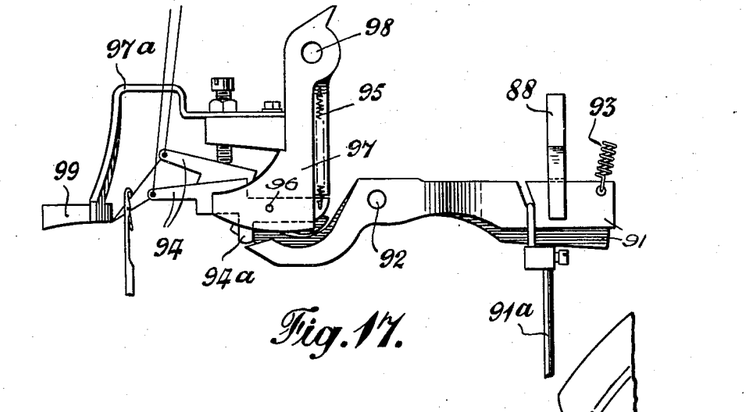
Figure 17 shows in side elevation a modified method of operating the thread guides.

As the roller 89 rides over the cam pieces on the pattern disc, the bar 88 is slid lengthwise and the pivoted arms 91 are, by the opposite inclines of the V throat in said bar, displaced in opposite directions on their pivot 92. This effects a relative displacement of the thread guides 94 and changes the pattern. The thread guides can be thrown out of operation from a main control of the machine through the medium of rod 91a independently of the patterning mechanism.

To ensure the threads being fed to the exact required needle after having been withdrawn a thread deflector plate 99 is positioned on the inner side of the needles, said plate advantageously being of part-circular shape in plan to follow the line of the needle bed and being fixed substantially close up to the needles with its under face a short distance below the needle tops or hooks when said needles are raised to take thread.

Conveniently the deflector plate is formed upon or secured to an angle strip or bracket 97a which projects up and out over the needles and is adjustably secured to the part 97 carrying the pivoted thread guides 94, said deflector 99 being so mounted as to be moved into and out of its operative position as and when required.

In operation, a thread after being withdrawn by the raising of a guide automatically coacts with and takes up a position beneath the deflector plate 99, the tension on the thread acting in conjunction with the deflector to ensure said thread when lowered between the needles to be fed to the exact required needle.

The formation of a diamond pattern may be produced by operating the thread guides from two pattern discs rotated in the same direction but relatively to each other, i. e. at two different speeds. As an alternative, however, this patterning may be produced by rotating two discs in opposite directions, and this may be accomplished in the manner shown in Figure 19 in which case the pattern disc 18a is rotated in an opposite direction to the remaining discs by means of intermeshing gears 100 and a second wheel 101 rotating with one of said gears 100 on a counter shaft 102. It will be appreciated that if two discs which individually produce diagonals are simultaneously rotated in opposite directions a diamond pattern is produced.

In a further modified arrangement the required movement of the thread guides for effecting the change-over plating may be effected from patterning devices to which both rotary and reciprocating motion is transmitted. In such a particular embodiment a suitable number of drums, cylinders or the like 103 (Figure 20) each having on its peripheral face suitably shaped and disposed projections 104, or suitably designed and disposed recessed parts (the portions not so recessed thus constituting projections), may be mounted upon an axial shaft 105 in such a manner as to be capable of axial movement thereon but incapable of rotary movement relatively to said shaft. Conveniently the drum is mounted to slide upon a key 106 accommodated in an elongated slot in the shaft.

The one end face of the drum 103 is formed with a suitable cam face 107 which preferably comprises two equal inclines 107a joined by relatively steep portions 107b (see Figure 21) said cam face 107 being maintained in contact with a similarly shaped cam face 108 formed at the one end or side of a relatively stationary drum member 109, the two drums being pressed together by a spring 110.

Figure 20:
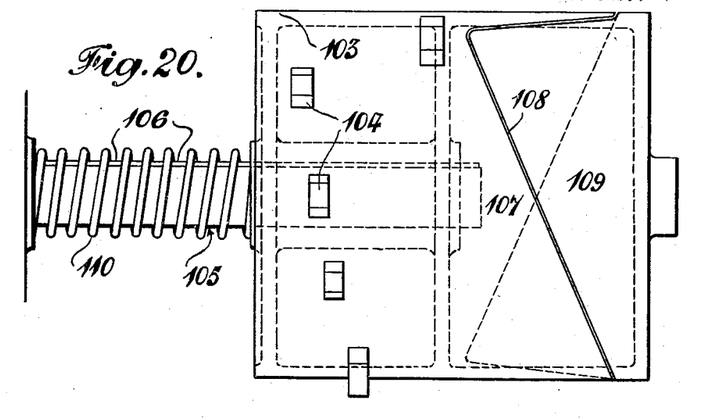
Figure 20 illustrates a method of transmitting both rotary and reciprocating motion to a pattern drum.

Rotary motion is transmitted to the shaft 105 and drum 103 thereon, conveniently by rotating a part to which said shaft is fixed, and it will be appreciated that as the shaft and drum rotate, the engagement between the two cams 107, 108 will cause the drum 103 to also slide axially to and fro on its shaft.

The desired movement is transmitted to the pivotally displaceable and reversible thread guides from the drums 103 so as to change the relative positions of said guides.

It will be appreciated that the pattern produced in the fabric depends upon the nature and disposition of the projections or recesses on the pattern drum 103 as also upon the speed of rotation of the patterning devices relatively to the speed of rotation of the needle cylinder.

If, for example, the patterning drums or the like are furnished with one or more projecting bars or ridge pieces extending longitudinally parallel with and in the same plane as the axis, and the drums rotate at the speed of the cylinder, then one or more vertical stripes will be produced in the fabric. If now the drums rotate at a speed greater or lesser than the machine, the same projection or projections thereon will produce one or more diagonal stripes. Further, by varying the speed of rotation and/or of reciprocation of the drums, the angular disposition of the stripes will be varied accordingly.

The speed of longitudinal movement of each drum can be varied by varying the degree of inclination of the cam face acting thereon.

Figure 21:
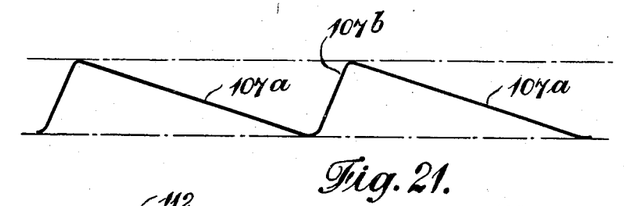
Figure 21 is a diagram showing development of the cam faces employed in Figure 20.

In order to avoid inversion of the pattern in cases where this is desired the movement of the drum may conveniently in one direction be rapid, and for this purpose the cam is formed with the before-mentioned steep fall or dip, 107b which acting in conjunction with the spring means at the opposite end of the drum, serves to return said drum rapidly to its starting position after its traverse. Means are conveniently incorporated for bluffing the yarn guides, i. e., holding same out of operation, during this return motion of the drum.

Figure 22:
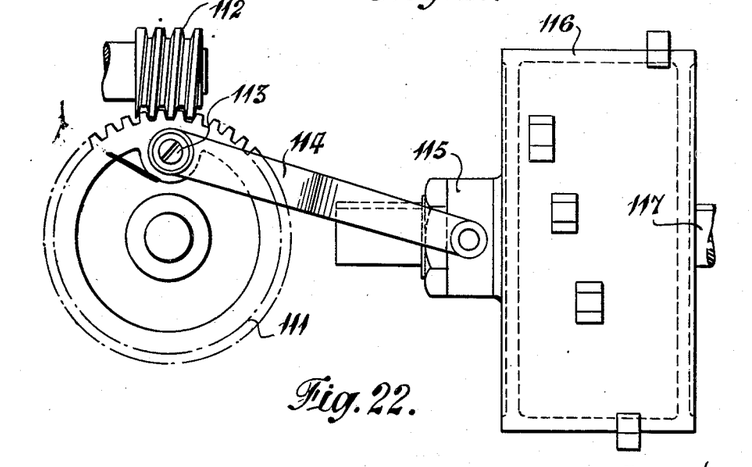
Figures 22 and 23 illustrate further methods of effecting the combined rotary and reciprocating motion in the pattern drum.

In lieu of the cam means for effecting reciprocation of the drums or the like a worm drive may be installed. For example a worm wheel 111 (Figure 22), rotated by an intermeshing engagement with a suitably rotated worm 112, may function as a disc crank by pivotally connecting to a projecting pin 113 on its one face the one end of a connecting rod 114 which is jointed at its opposite end to a collar 115 or the like freely mounted upon the one end of a number of coaxial pattern drums 116. In such arrangement, as the worm wheel 111 rotates, a reciprocating motion is transmitted to drums 116, and simultaneous rotary motion may also be given to the drums by turning the shaft 117 upon which same are slidably mounted.

Figure 23:
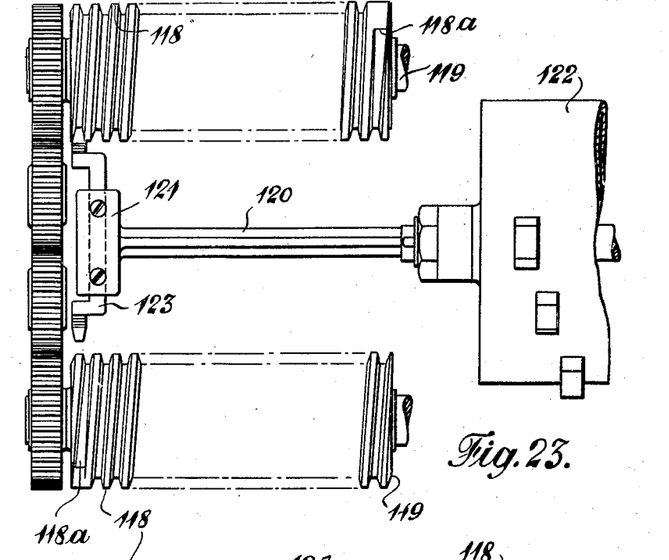
Figure 24:
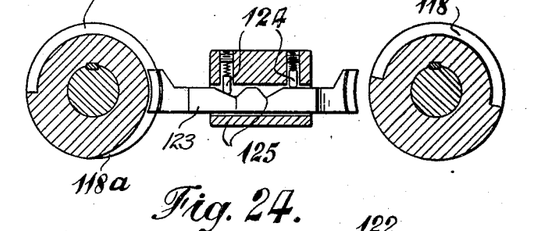
Figure 24 is a sectional end view of Figure 23.

In another arrangement (Figures 23 to 25), a pair of worm members 118 consisting of spirally grooved sleeves or cylinders may be keyed to two parallelly disposed shafts 119, and extending intermediate of and parallel with the axes of said worms is a rod 120 connected at one end to a slidably mounted member 121 and at its opposite end to a number of coaxial pattern drums 122.

On the sliding member 121 is a spring-influenced laterally displaceable pin or the like 123 which engages with the groove in one of the two worms 118. In operation, the two worms are simultaneously rotated, and presuming the pin 123 is at that end of the one worm remote from the drums, said pin traverses the spiral groove to the other end of the worm and the drum 122 is also traversed axially in one direction. On reaching this position, the pin 123 is forced out of engagement with the spiral groove at the worm end by so forming the said groove that the base thereof merges into the circumferential face of the worm as at 118a in Figure 24, and on the pin being pressed out of the groove in the one worm, same is simultaneously pressed into the groove at the adjacent end of the second worm along which groove the pin travels so as to move the rod and drums operated thereby in an opposite direction.

On reaching the end of said second worm, the pin is operated as above to move from the groove in said worm to the commencement of the groove in the first-named worm so as to effect the forward movement again.

The spring means influencing the worm-engaging pin 123 preferably function positively to retain the pin in engagement with the groove of either worm, and may also serve to complete the required displacement of said pin after an initial movement has been effected by the shape of the groove extremity as above described.

This may be accomplished by providing two suitably guided spring-pressed pins 124 and two inclined faced recesses 125 in the sliding pin 123, the relative positions of the recesses 125 and pins 124 being such that when the sliding pin 123 is moved out of one worm by the end portion 118a one of the pins 124 is moved out of one recess 125 and the other acts upon the inclined face of the other recess to traverse the pin 123 further and bring same into engagement with the groove of the other worm.

Figure 25:
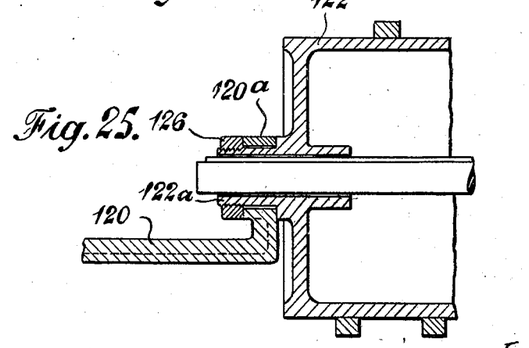
Figure 25 is a sectional view showing a method of connecting the pattern drum shown in Figure 23 to the reciprocating means.

The rod 120 may be connected to the drum 122 by forming at the rod end a collar 120a which loosely encircles a hub portion 122a of the drums and is retained by nut 126 said connection permitting free rotation of the drums relatively to the carrier rod 120.

If the two worms are geared so as to rotate in opposite directions, the direction or angle of the grooves in both worms will be identical, whereas if the worms rotate in the same direction, the grooves will be oppositely disposed.

If the pitch of the spiral of each worm is uniform throughout its length, it will be obvious that the speed of the reciprocating movement transmitted is also uniform. If, however, the pitch of the spiral is varied, the speed of the transmitted reciprocating movement is correspondingly varied. The drums may be secured in an axially slidable manner upon the shaft of one of the worms, and by so doing a combined rotary and reciprocating motion is produced in such drums.

From the foregoing it will be seen that on machines constructed and functioning in accordance with this invention hose and half hose of an entirely novel type and presenting entirely new effects can be produced. The range of patterns available for production is practically unlimited whilst as previously stated the fabric is of uniform thickness and construction throughout excepting where splicing or reinforcing threads are introduced.

It will be understood that while the leg A of a stocking or sock (Figure 26) is being knitted, the half-cam pattern disc 18c is inoperative, and the other discs are selected for operation as desired. When the foot is being produced, the half-cam disc 18c is brought into operation so as to produce a plain sole B with patterned upper C. At the heel D and toe E, the clutch 27 is operated to stop the rotation of the pattern discs and the interceptor 34 is brought into operation to maintain a plain feed.

Figure 26:
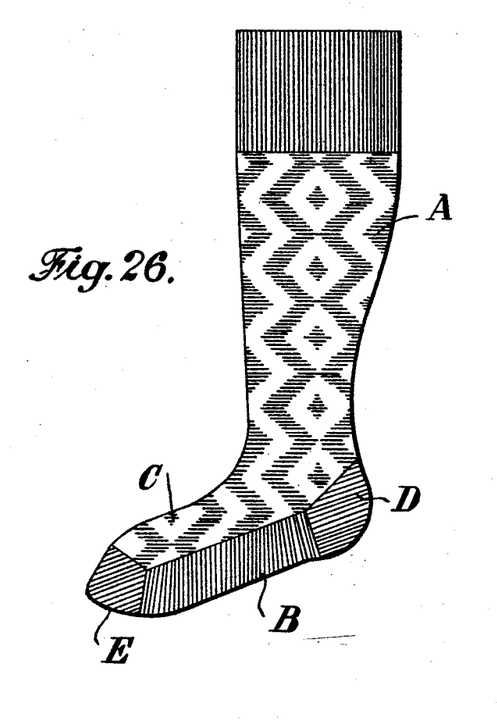
Figure 26 illustrates by way of example a sock which can be produced by a machine in accordance with the present invention.

It will be obvious that as all plain portions of the fabric are produced by pushing the sliding frame 11 forward, the same coloured thread is caused to plate throughout all said plain parts. Further, it will be appreciated that when cam disc 18c is brought into operation in the foot, the half cam holds the guides stationary for one half of each revolution to produce the plain sole B but permits a continuation of the patterning for the other half revolution to produce the patterned upper C, the pattern in said upper continuing unbroken from the leg A. Reinforcing threads may be introduced at the heel and toe.

If desired, the sole portion B of the foot may be produced from yarn different from those employed in the patterned leg A and foot upper C, that is to say the leg and foot upper may be of silk and cotton and the sole of wool. An additional feature of the invention thereby resides in the provision of a stocking or sock having a patterned leg and foot upper produced by changeover or reverse plating and a sole portion produced from entirely different yarn from those employed in said patterned leg and foot upper.

The yarn employed in knitting the foot sole may, if desired, consist of the splicing or reinforcing threads introduced in the stocking.

An important factor in connection with the present invention is that all the aforesaid effects can be produced in an entirely automatic manner without the speed of the machine being in any way reduced.

I claim:—

1. In circular knitting machines, a plurality of rotatable members, patterning elements carried respectively by said members, thread controlling means and an adjustable selector operable to select any one or more of said rotatable members to operate said thread controlling means.

2. In circular knitting machines, a plurality of independently rotatable patterning members supported co-axially and side by side, a plurality of thread controlling members and selector means operable to select any one or more of said patterning members to operate upon the same or selected thread controlling members.

3. In circular knitting machines, a plurality of independently rotatable patterning members, a plurality of thread controlling members, means for rotating said patterning members at different speeds, a plurality of relatively displaceable thread controlling members, selector means operable to select any one or more of said patterning members to operate the same or selected thread controlling members and displaceable means operating intermediate of the selector means and the said controlling members.

4. In circular knitting machines, a plurality of rotatable patterning members, thread controlling means, selector means operable to select any one or more of said patterning members to operate said thread controlling means and an additional traversable member adapted to throw out of operation the patterning members at predetermined times.

5. In circular knitting machines, a plurality of rotary pattern wheels or discs, a plurality of relatively displaceable thread guides, selector means, and an additional rotary wheel having projecting elements adapted to coact with said selector means to select any one or more of said pattern wheels for operation on the guides or render all of said pattern wheels inoperative.

6. In circular knitting machines, a plurality of rotary pattern wheels, a plurality of relatively displaceable thread guides, a selector device functioning to select any one or more of said pattern wheels to operate upon said thread guides, a rotary pattern control wheel functioning to operate upon the said selector device and determine the position thereof, mechanism intermittently rotating said pattern control wheel and elements carried by said control wheel for operating the thread guides through intervening mechanism.

7. In circular knitting machines, a plurality of rotary pattern members, peripheral projections on said members, gear wheels rotating with said pattern members, a drive shaft, gears driven by said shaft and meshing with the gears on the pattern members, a plurality of relatively movable thread guides, a sliding member coacting with said guides and selector means operating intermediate of said sliding member and pattern members to select any one or more of said pattern members to operate said guides or render all of said pattern members inoperative.

8. In circular knitting machines, a plurality of rotary pattern members, gears carried by and rotating with said members, a rotary shaft, gears on said shaft meshing with said pattern member gears, a clutch device associated with said shaft, a cam drum operating said clutch to withhold the pattern members from operation and permit the rotation thereof at predetermined times, means effecting operation of the gears and pattern members from a drive shaft, a plurality of displaceable thread guides, and a selector device operating to select any one or more of said pattern members to operate the same or selected thread guides or render all of said pattern members inoperative.

9. In circular knitting machines, a plurality of rotary pattern members, gears on said members, a rotary shaft, gears on said shaft meshing with the pattern member gears, manually operable eccentric mechanism for throwing into and out of gear any one or more of the pattern members, a drive shaft mechanism operated from said shaft for rotating the inter-meshing gears, relatively displaceable thread guides, and selector means operable to select any one or more of said pattern members to operate said thread guides or render all of said pattern members inoperative.

10. In circular knitting machines, a plurality of rotary pattern wheels or discs, gears carried by said wheels, a rotary shaft, gears on said shaft adapted to mesh with the pattern wheel gears, a drive shaft, mechanism operable from said drive shaft for rotating the gears and pattern wheels, means for rotating one or more of the pattern wheels in a direction opposite to that of the remaining wheel or wheels, relatively displaceable thread guides and selector devices operable to select any one or more of said pattern members to operate said thread guides or render all of said pattern members inoperative.

11. In circular knitting machines a plurality of rotary pattern wheels, means for effecting rotation of said wheels, a plurality of pivoted thread guides, spring influenced means engaging with said guides, a sliding means arranged to be moved by the pattern wheels and coacting with said spring influenced means, and a selector device operable to select any one or more of said pattern members to operate said thread guides or render all of said pattern members inoperative.

12. In circular knitting machines a plurality of traversable patterning members, a plurality of relatively displaceable thread guides, a pattern selecting device operating to select any one or more of the patterning members to operate the thread guides and thread deflecting means embodying an upstanding part having an inclined thread deflecting edge located adjacent to said thread guides for ensuring the threads being always guided to the needles at the proper angle.

13. In a circular knitting machine a plurality of independent disks co-axially supported side by side, pattern cams carried respectively by the said disks, a plurality of thread guides, means for moving the guides into and out of operative position, and a selector adjustable on lines parallel with the axis of the cam-carrying disks and arranged according to its position to constitute an operating connection between the cams that may be selected for operation and the means that move the thread guides.

14. In a circular knitting machine a plurality of independent disks co-axially supported side by side, pattern cams carried respectively by the said disks, means for independently rotating the cam-carrying disks, thread guides, and an adjustable selector means arranged to be interposed between the patterning cams and the thread guides.

15. The combination stated in claim 14 including means whereby the patterning means may be rotated at different speeds.

16. In a circular knitting machine the combination of a plurality of guides for delivering thread to the needles, a frame for controlling the movements of the thread guides into and out of working positions, supported to slide in a path radial to the circular bank of needles, a plurality of rotatable disks supported side by side co-axially, pattern cams carried by the disks, and adjustable selector means through which the cams carried by one or another disk may be caused to move the sliding frame that controls the movements of the thread guides, accordingly as the selector is adjusted in position.

17. In a circular knitting machine the combination of a plurality of thread guides, a plurality of independent disks, patterning cams carried by the disks, independent gears through which the disks are rotated, adjustable selector means by which the patterning cams carried by any of the disks may be caused to operate the thread guides, and clutch mechanism through which the driving gears for the pattern disks may be connected with or disconnected from the source of power at will.

THOMAS HENRY JONES.